United States Patent
Yang et al.

(10) Patent No.: US 8,675,921 B2
(45) Date of Patent: *Mar. 18, 2014

(54) DISTANCE MEASUREMENT METHOD AND SYSTEM, AND PROCESSING SOFTWARE THEREOF

(75) Inventors: Shu-Sian Yang, Hsinchu (TW); Ren-Hau Gu, Hsinchu (TW); Hsin-Chia Chen, Hsinchu (TW); Sen-Huang Huang, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 220 days.

This patent is subject to a terminal disclaimer.

(21) Appl. No.: 13/224,411

(22) Filed: Sep. 2, 2011

(65) Prior Publication Data

US 2012/0057175 A1 Mar. 8, 2012

(30) Foreign Application Priority Data

Sep. 3, 2010 (TW) .............................. 99129974 A

(51) Int. Cl.
*G06K 9/00* (2006.01)
(52) U.S. Cl.
USPC ........................................................ 382/106
(58) Field of Classification Search
None
See application file for complete search history.

(56) References Cited

U.S. PATENT DOCUMENTS

| 2006/0044546 A1 | 3/2006 | Lewin et al. |
| 2007/0216894 A1 | 9/2007 | Garcia et al. |

FOREIGN PATENT DOCUMENTS

| CN | 1735789 A | | 2/2006 |
| CN | 101451833 A | | 6/2009 |
| JP | 8210812 A | | 8/1996 |
| JP | 2006038571 A | | 2/2006 |
| JP | 2007107923 A | | 4/2007 |
| TW | 201031895 A | | 9/2010 |
| WO | WO 2007043036 A1 | * | 4/2007 |

* cited by examiner

*Primary Examiner* — Nirav G Patel
(74) *Attorney, Agent, or Firm* — WPAT, PC; Justin King

(57) ABSTRACT

A distance measurement system and method are provided. The distance measurement method first projects a light beam with a speckle pattern to reference planes and an object to allow the reference planes and a surface of the object each have an image of the speckle pattern, the speckle pattern having a plurality of speckles. Next, images of the speckle pattern reflected by the reference planes are captured to generate reference image information, and an image of the speckle pattern reflected by the surface of the object is captured to generate an object image information. A processing module which may be a processing software can compare the object image information with the reference image information to obtain several similarity scores. If the most the most similarity score is greater than a threshold value, the processing module identifies the corresponding reference plane, thereby computing the position of the object.

9 Claims, 10 Drawing Sheets

DISTANCE MEASUREMENT METHOD AND SYSTEM, AND PROCESSING SOFTWARE THEREOF

CROSS-REFERENCE TO RELATED APPLICATION

This application claims the priority benefit of Taiwan application serial no. 099129974, filed on Sep. 3, 2010. The entirety of the above-mentioned patent application is incorporated herein by reference and made a part of this specification.

FIELD OF THE INVENTION

The present invention relates to distance measurement, and more particularly to a three dimensional (3D) distance measurement method and system.

BACKGROUND OF THE INVENTION

Currently, distance measurements include contact distance measurements and non-contact distance measurements. Wherein the contact distance measurements are conventional, and an example of which is called coordinate measuring machine (CMM). Although the contact distance measurements have been very precise, as the contact distance measurement should contact the object, probes of the contact distance measurement instruments may damage the object. Therefore, the contact distance measurement instruments are not suitable for expensive objects.

Relative to the conventional distance measurement instruments, the non-contact distance measurement instruments can have an operation frequency of several millions, therefore are widely used in a variety of fields. The non-contact distance measurement instruments include active non-contact distance measurement instruments and passive non-contact distance measurement instruments. A typical active non-contact distance measurement instrument usually projects an energy wave to an object and computes a distance between the object and a reference point through reflection of the energy wave. Common energy waves include visible light, high power light beam, ultrasonic wave and X-ray.

SUMMARY OF THE INVENTION

Therefore, the present invention provides a distance measurement method and a distance measurement system, which can carry out a 3D non-contact distance measurement and have higher reliability.

In addition, the present invention further provides storage media with a processing software, which can process data of the distance measurement system, and reliably compute a position of an object.

A distance measurement system provided by the present invention comprises a plurality of reference planes, a light source module, an image capture device and a processer module. The light source module is capable of projecting a light beam with a speckle pattern to the reference planes and an object, so that a plurality of images with the speckle pattern are shown on the reference planes and a surface of the object respectively, wherein the speckle pattern has a plurality of speckles. Meanwhile, the image capture device captures images having the speckle pattern shown on the reference planes, so as to generate a plurality of reference image information. In addition, the image capture device further captures an image having the speckle pattern shown on the surface of the object, so as to generate an object image information. The object image information is compared with each of reference image information by the processing module, so as to obtain a plurality of similarity scores. At this time, the processing module would determine whether or not the highest similarity score is greater than or equal to a threshold value. When the highest similarity score is less than a threshold value, the processing module ignores the distance measurement result. In contrast, when the highest similarity score is greater than or equal to the threshold value, the processing module computes the position of the object according to the position of corresponding reference plane having the highest similarity score.

In one embodiment of the present invention, distances between each of the reference planes and next reference plane are the same.

From another viewpoint, a distance measurement method provided by the present invention comprises a step of projecting a light beam with a speckle pattern to a plurality of reference planes and an object, so that a plurality of images with the speckle pattern are shown on the reference planes and a surface of the object illuminated by the light beam, wherein the speckle pattern has a plurality of speckles. Then, the images with the speckle pattern shown on the reference planes and on the surface of the object are captured respectively, so as to respectively generate a plurality of reference image information and an object image information. Therefore, the object image information is compared with each of reference image information, so as to obtain a plurality of similarity scores. Meanwhile, when the highest similarity score is less than a threshold value, the distance measurement result is ignored. In addition, when the highest similarity score is greater than or equal to the threshold value, the position of object is computed according to the position of corresponding reference plane having the highest similarity score.

From another viewpoint, a storage media with a processing software is provided. The processing software is configured for performing steps including receiving a plurality of reference image information derived from a plurality of images with a speckle pattern shown on a plurality of reference planes by reflecting the light beam illuminated onto, wherein the speckle pattern has a plurality of speckles. In addition, the processing software further receives an object image information derived from an image having the speckle pattern shown on a surface of an object by reflecting the light beam illuminated onto. Then, the object image information is compared with each of the reference image information, so as to obtain a plurality of similarity scores. When the highest similarity score is less than the threshold value, the distance measurement result is ignored. In contrast, when the highest similarity score is greater than or equal to the threshold value, the position of the object is computed according to the position of corresponding reference plane having the highest similarity score.

Since the present invention performs the distance measurement based on images with a speckle pattern reflected by a plurality of reference planes and an object, thus a 3D non-contact distance measurement can be carried out. In addition, since the present invention compares the most similarity score with a threshold value, thus a high reliability is obtained.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
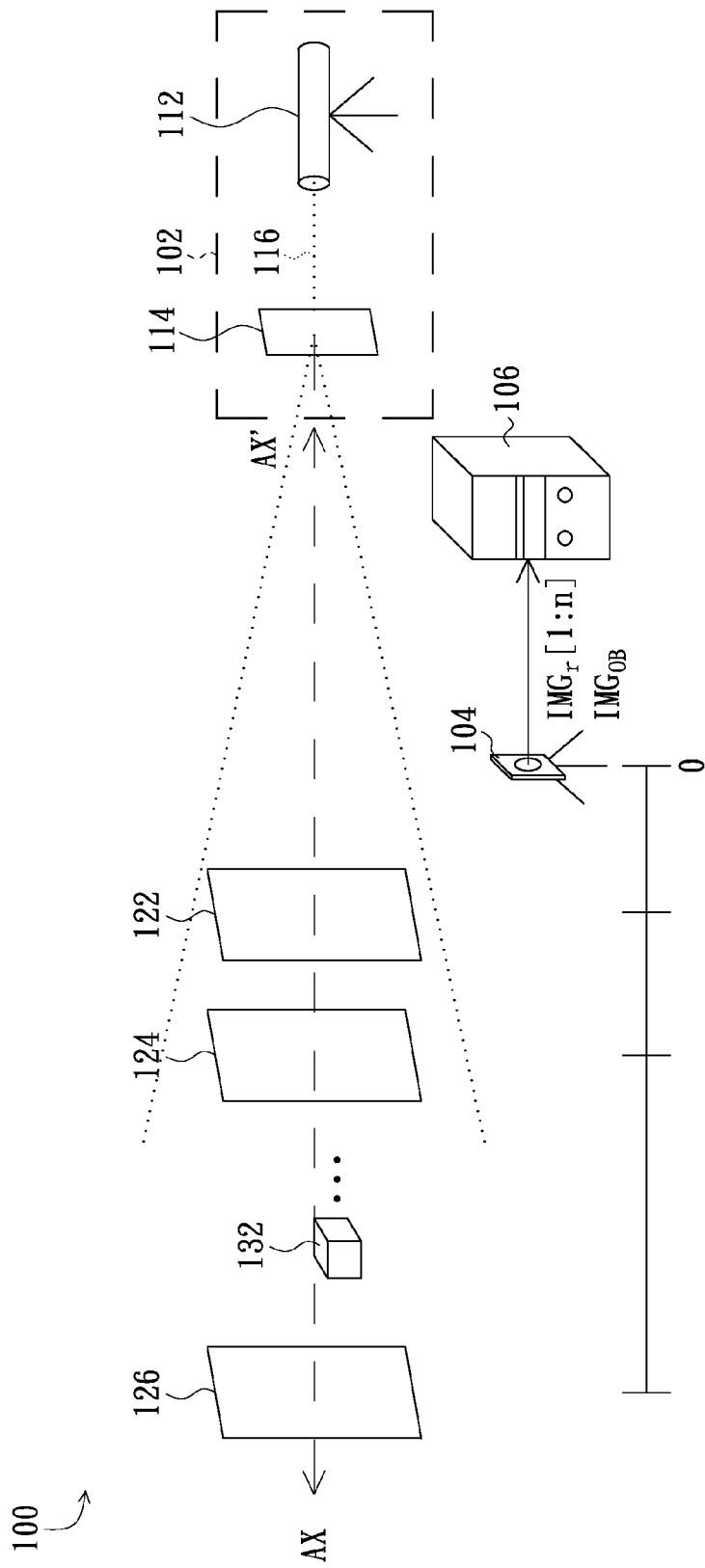
FIG. 1 is a schematic view of a distance measurement system in accordance with a first embodiment of the present invention.
Figure 2A:
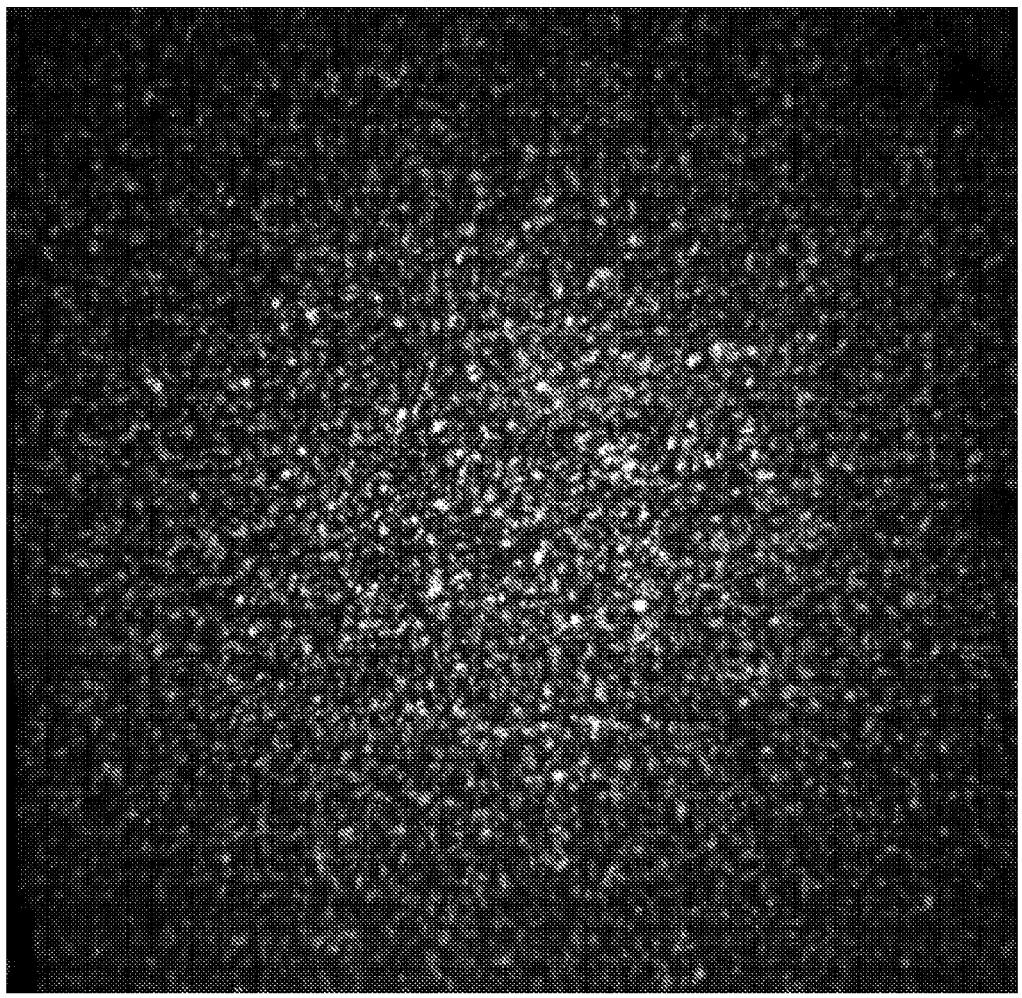
FIGS. 2A-2D show images of a speckle pattern reflected by reference planes which are spaced a reference point 70, 75, 80, and 85 centimeters, respectively.
Figure 2B:
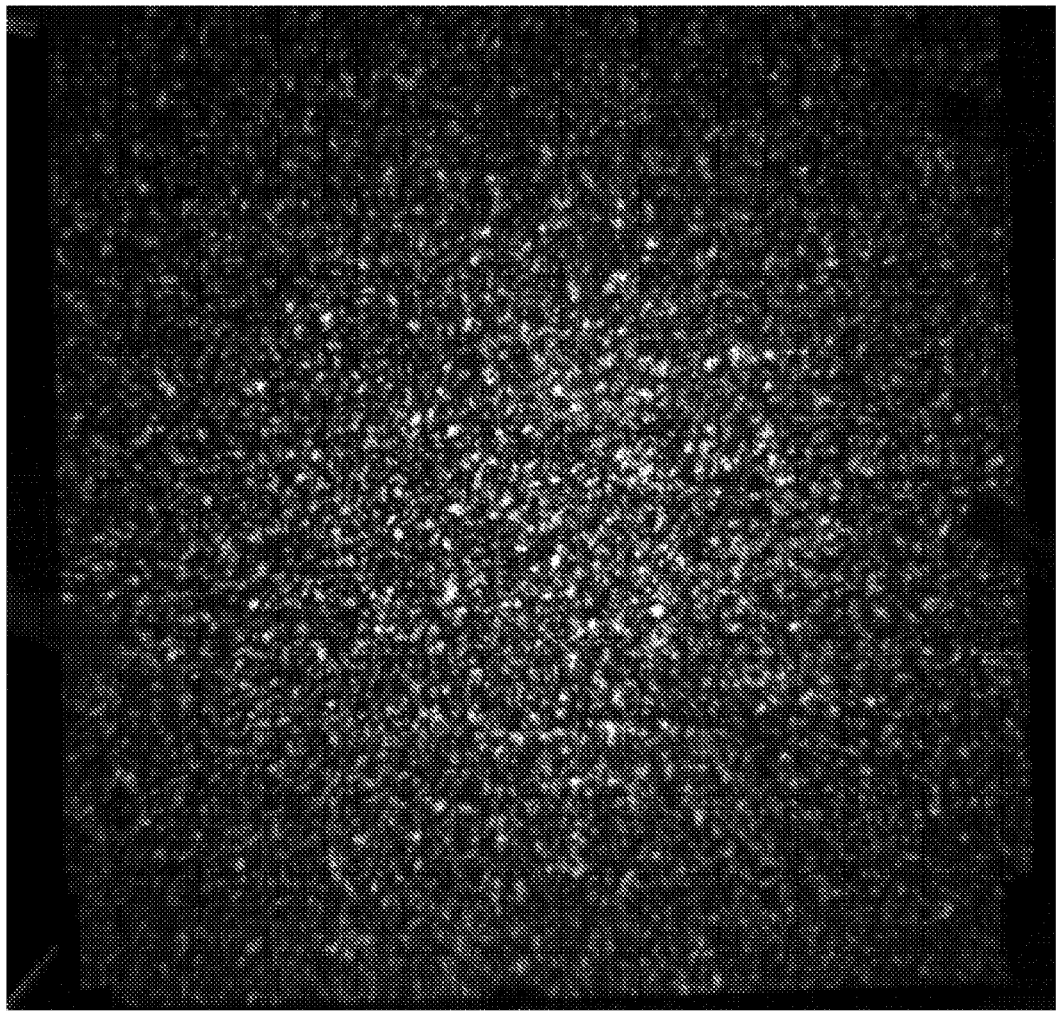
Figure 2C:
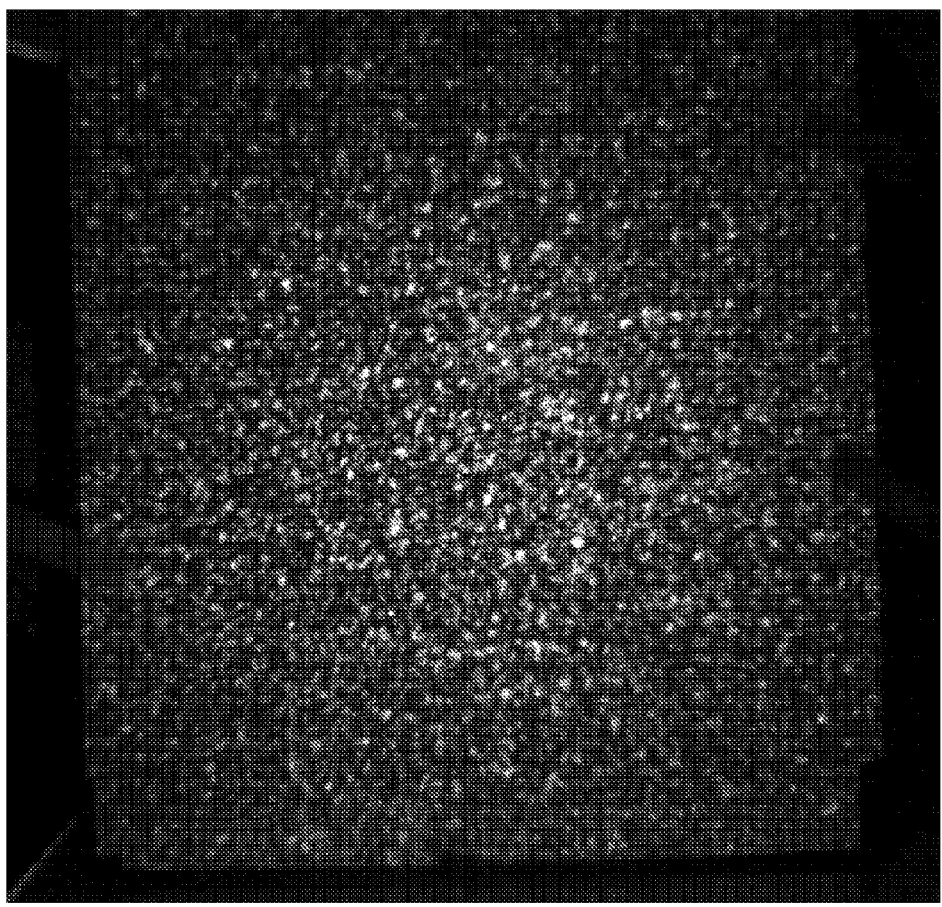
Figure 2D:
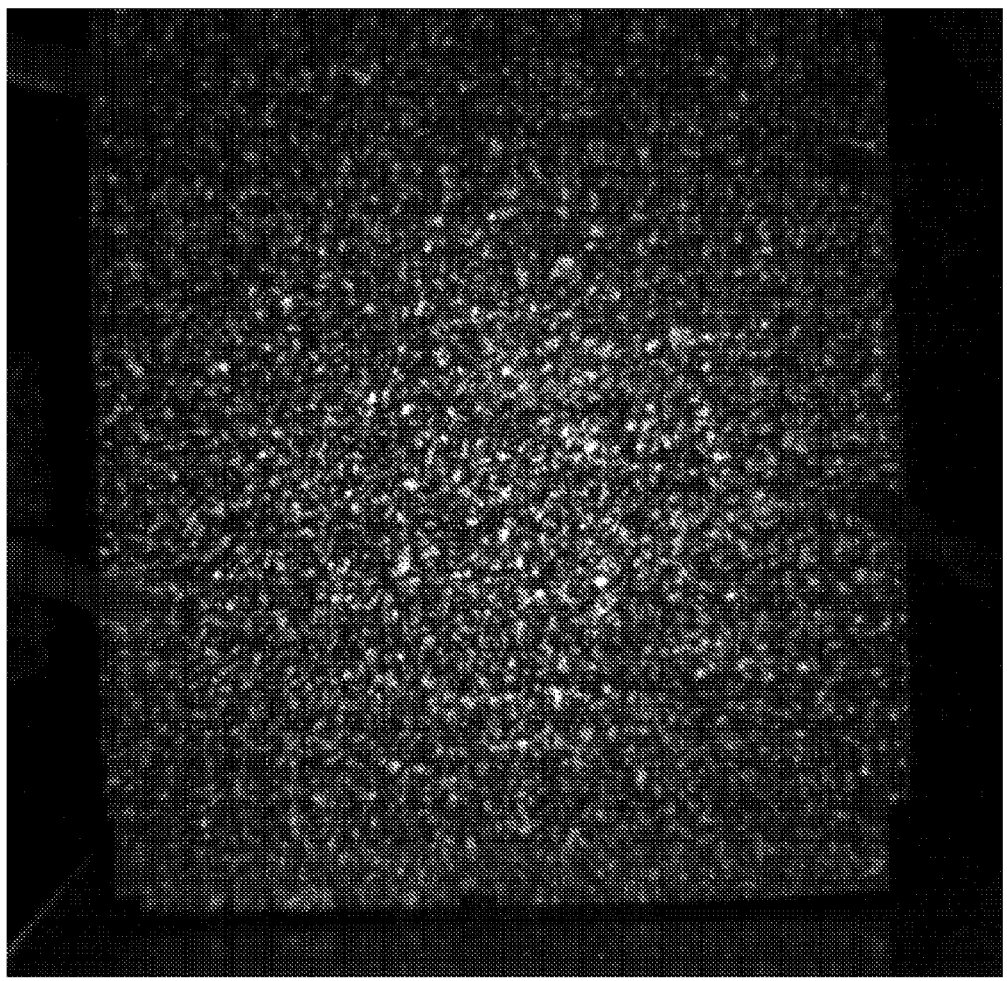

FIG. 1 shows a distance measurement system in accordance with a first embodiment. Referring to FIG. 1, the distance measurement system 100 of the present embodiment includes a light source module 102, an image capture device 104 and a processing module 106. The light source module 102 is capable of providing a light beam having a speckle pattern to a detectable region, wherein the light source module 102 may be a planar light source module. In addition, the image capture device 104 can be coupled to the processing module 106.

In the present embodiment, the light source module 102 includes a laser light source 112 and a light diffusing element 114. Wherein, the laser light source 112 can be a gas laser, e.g., a He—Ne laser, or a semiconductor laser. In addition, the light diffusing element 114 can be a diffusion sheet, a piece of ground glass or a diffraction element. When the laser light source 112 projects a laser light beam 116 to the light diffusing element 114, the laser beam 116 would be caused diffraction and interference, so as to form the light beam having the speckle pattern.

Referring to FIG. 1, in the present embodiment, the light source module 102 is capable of projecting the speckle pattern to a plurality of reference planes, such as the reference planes 122, 124 and 126. In some embodiments, the reference planes 122, 124 and 126 can be parallel with each other in a viewable region. In other embodiments, distances between each of reference plane spaces and reference plane are the same. In addition, in the present embodiment, the reference planes 122, 124 and 126 are substantially perpendicular to an optical axis AX-AX' of the laser light beam 116, i.e., the optical axis AX-AX' of the light source module 102 (such as the planar light source module mentioned above). In addition, the reference planes 122, 124, and 126 may be on the optical axis AX-AX' at the same time, or at least one of the reference planes 122, 124, and 126 may be not on the optical axis AX-AX' at the same time.

When the speckle pattern is projected to the reference planes, each of the reference planes 122, 124 and 126 would reflect the light beam having the pattern provided from the planar light source module and then form images of the speckle pattern, which are shown as FIGS. 2A-2D. FIGS. 2A-2D show the images of the speckle pattern reflected by the reference planes spaced a reference point 70, 75, 80, and 85 centimeters, respectively. Viewed from FIGS. 2A-2D, the images with the speckle pattern have a plurality of speckles. At this time, the image capture device 104 would capture the images from the reference planes 122, 124 and 126, and generate a plurality of reference image information IMGr[1:n] to the processing module 106, wherein n is an integer greater than 1. In the present embodiment, the image capture device 104 may be a video camera or a charge-coupled device. In addition, the processing module 106 may be a computer system or a processing software installed in a storage media, and is configured for analyzing the position of the object. Detail principle is specified as follows.

In some embodiments, the image capture device 104 is placed on a reference point O, and is placed at a side of the optical axis AX-AX'. Viewed from FIGS. 2A-2D, each speckle is shown on different positions on each reference plane. In order to determine the positions of each speckle on each reference plane, in the present invention, brightness of each speckle is referred. That is, the closer the speckle to the optical axis AX-AX', the brighter the speckle is. In contrast, when the speckles leaves away the optical axis AX-AX' on different reference planes, the brightness thereof is decreased. By detecting the brightness of each speckle on each reference plane, the position of each speckle on each reference plane can be obtained.

As environment light impacts on the brightness of the speckle, it may result that the processing module 106 gives a wrong determination. Therefore, in some embodiments, the processing module 106 can normalize brightness values of all of the speckles to eliminate the influence of the environment light. In other embodiments, the processing module 106 can analysis brightness relations among each speckle and the other speckles to constitute brightness information of each speckle. Then the brightness information can replace the brightness values to be computed by the processing module 106, with which the influence of the environment light can be got rid of.

Figure 3:
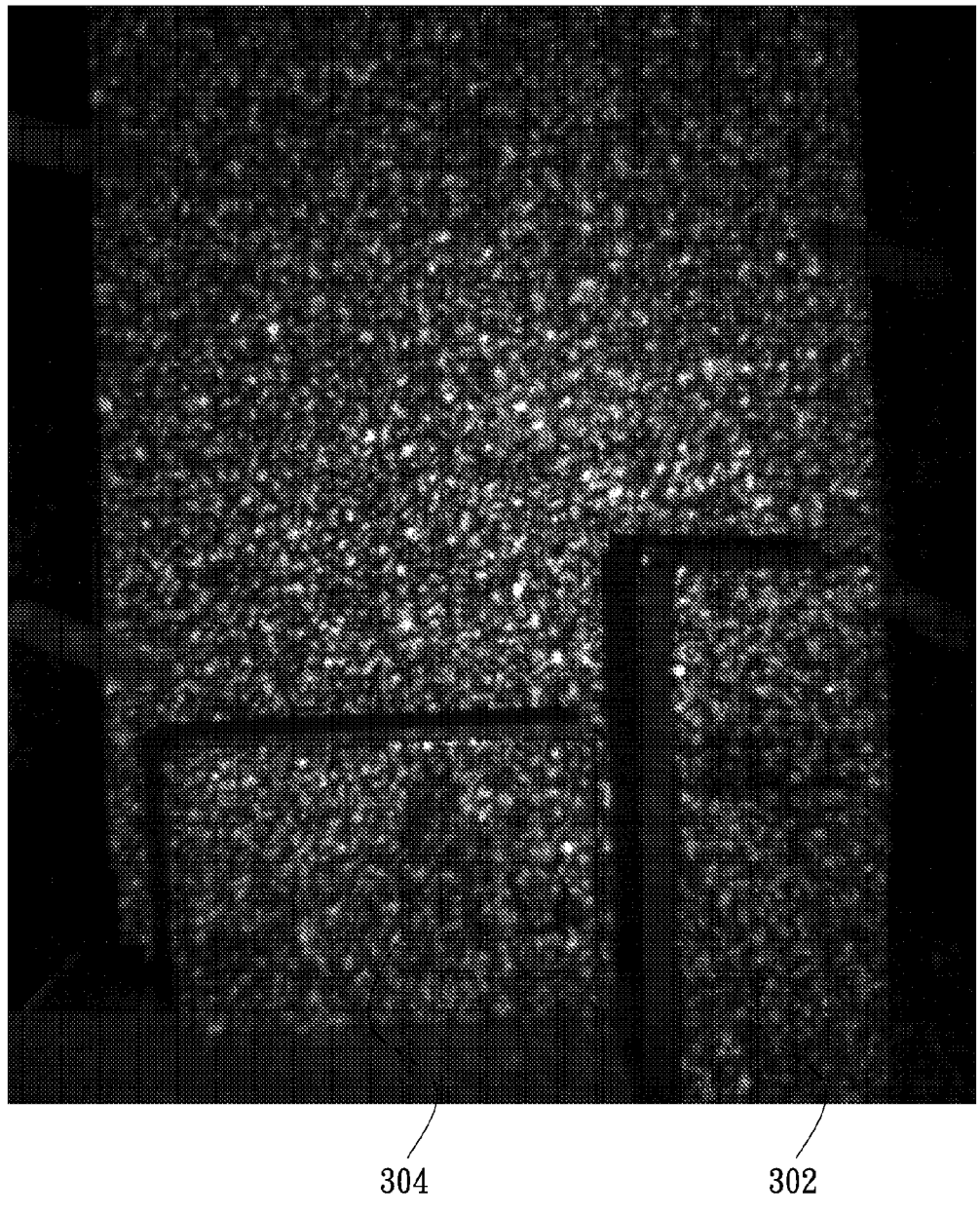
FIG. 3 shows an image of a speckle pattern reflected by a surface of an object in accordance with a preferred embodiment of the present invention.

Referring again to FIG. 1, when an object 132 enters into the detectable region illuminated by the light beam provided from the light source module 102 (such as the planar light source module mentioned above), a surface of the object 132 which faces the planar light source module would reflect the light beam, thus the image having the speckle pattern is shown as FIG. 3. FIG. 3 shows the image having the speckle pattern reflected by a surface of an object in accordance with a preferred embodiment. In FIG. 3, the images of regions 302 and 304 are the images with the speckle pattern reflected by a surface of an object 132. At this time, the image capture device 104 would obtain the images from the object 132, and generate an object image information $IMG_{OB}$ to the processing module 106.

When the processing module 106 receives the object image information $IMG_{OB}$, the object image information $IMG_{OB}$ is compared with each of reference image information IMGr[1:n] for obtaining a plurality of similarity scores. In some embodiments, the processing module 106 finds the highest similarity score, and computes the position of the object 132 according to the position of the corresponding reference plane having the highest similarity score. For example, when the distance between the position of corresponding reference plane having the highest similarity score distances and the reference point O is 80 centimeters, the processing module 106 can compute the position of the object 132 distances with the reference point O about 80 centimeters.

In other embodiments, the processing module 106 will choose M the highest similarity scores for calculation, wherein M is an integer greater than or equal to 2. For example, the processing module 106 will choose 3 the highest similarity scores, and can more precisely compute the position of the object 132 by an interpolation method.

However, in some situations, environment light, noise, transmission mistake and so on may impact on the object image information $IMG_{OB}$ generated by the image capture device 104, thus impact on the calculation of the processing module 106. If the processing module 106 computes the position of the object 132 based on error similarity scores, then the calculation may be a mistake. Therefore, in the present embodiment, when the processing module 106 obtains the said similarity scores from the comparison of the object image information $IMG_{OB}$ with the reference image information IMGr[1:n], the highest similarity score is chosen to compare with a threshold value.

When the processing module 106 determines that the highest similarity score is less than the threshold value, it may be determined that the highest similarity score is error, and then the distance measurement this time is ignored. In contrast, when the processing module 106 determines that the highest similarity score is greater than or equal to the threshold value, then the position of the object 132 can be computed according to the position of corresponding reference plane having the highest similarity score.

Figure 4:
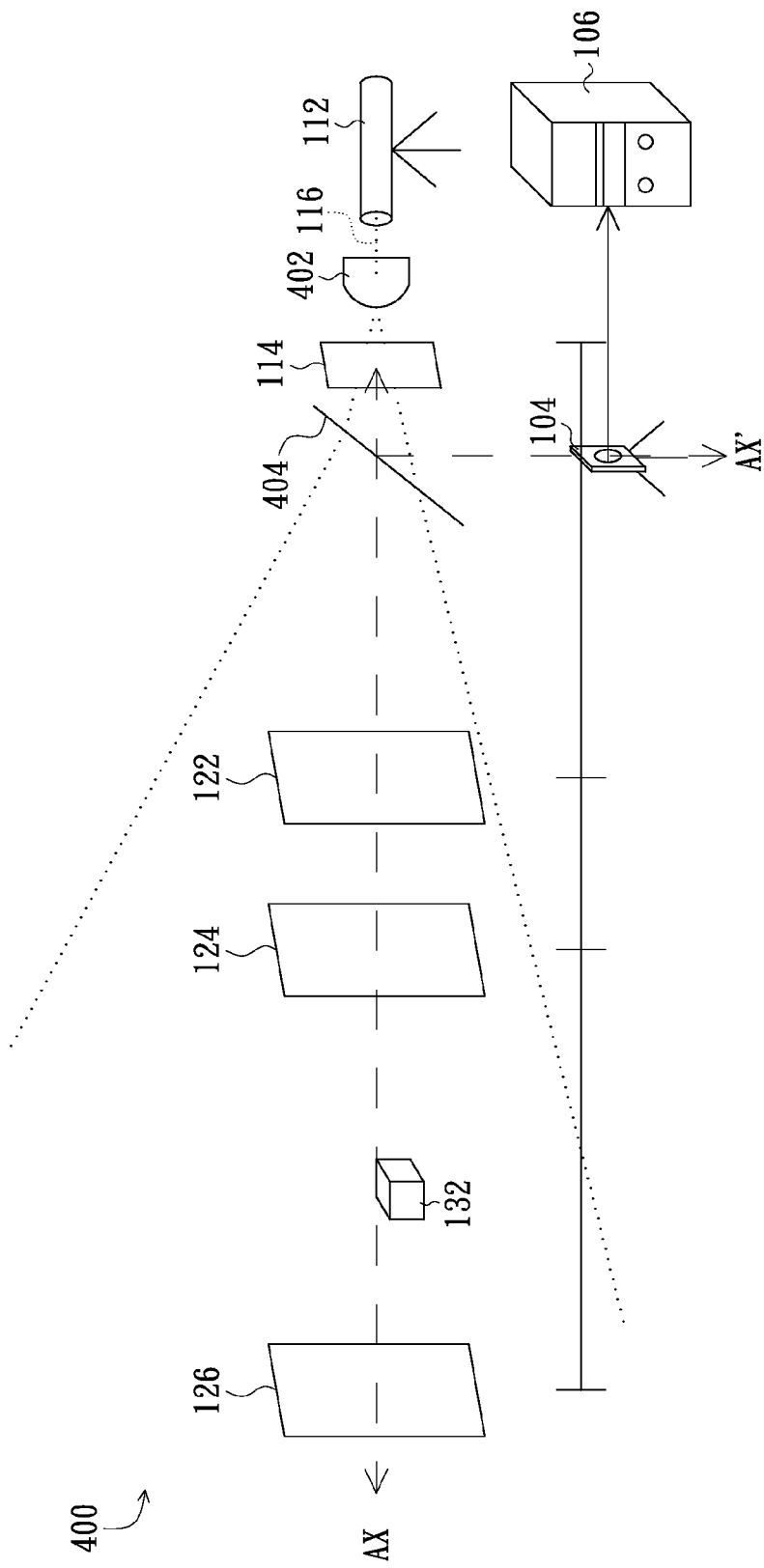
FIG. 4 is a schematic view of a distance measurement system in accordance with a second embodiment of the present invention.

FIG. 4 shows a distance measurement system in accordance with a second embodiment of the present invention. Relative to the first embodiment, in which the image capture device 104 is placed at a side of the optical axis AX-AX', and is located at a position between the laser light source 112 and the first reference plane 122, referring to FIG. 4, in the distance measurement system 400 of the present embodiment, the image capture device 104 aims at the optical axis AX-AX'. In addition, in the present embodiment, a lens 402 is configured between the laser light source 112 and the light diffusing element 114. When the laser light beam 116 passes through the lens 402 (such as an extender lens), the laser light beam 116 will be extended and then reaches the light diffusing element 114. Furthermore, a beam splitter 404 is configured between the light diffusing element 114 and the first reference plane 122. Therefore, the light reflected from the reference planes 122, 124, 126 and the object 132 will be received by the image capture device 104 by the help of the beam splitter 404. With this configuration, the image capture device 104 aims at the optical axis AX-AX'.

Figure 5:
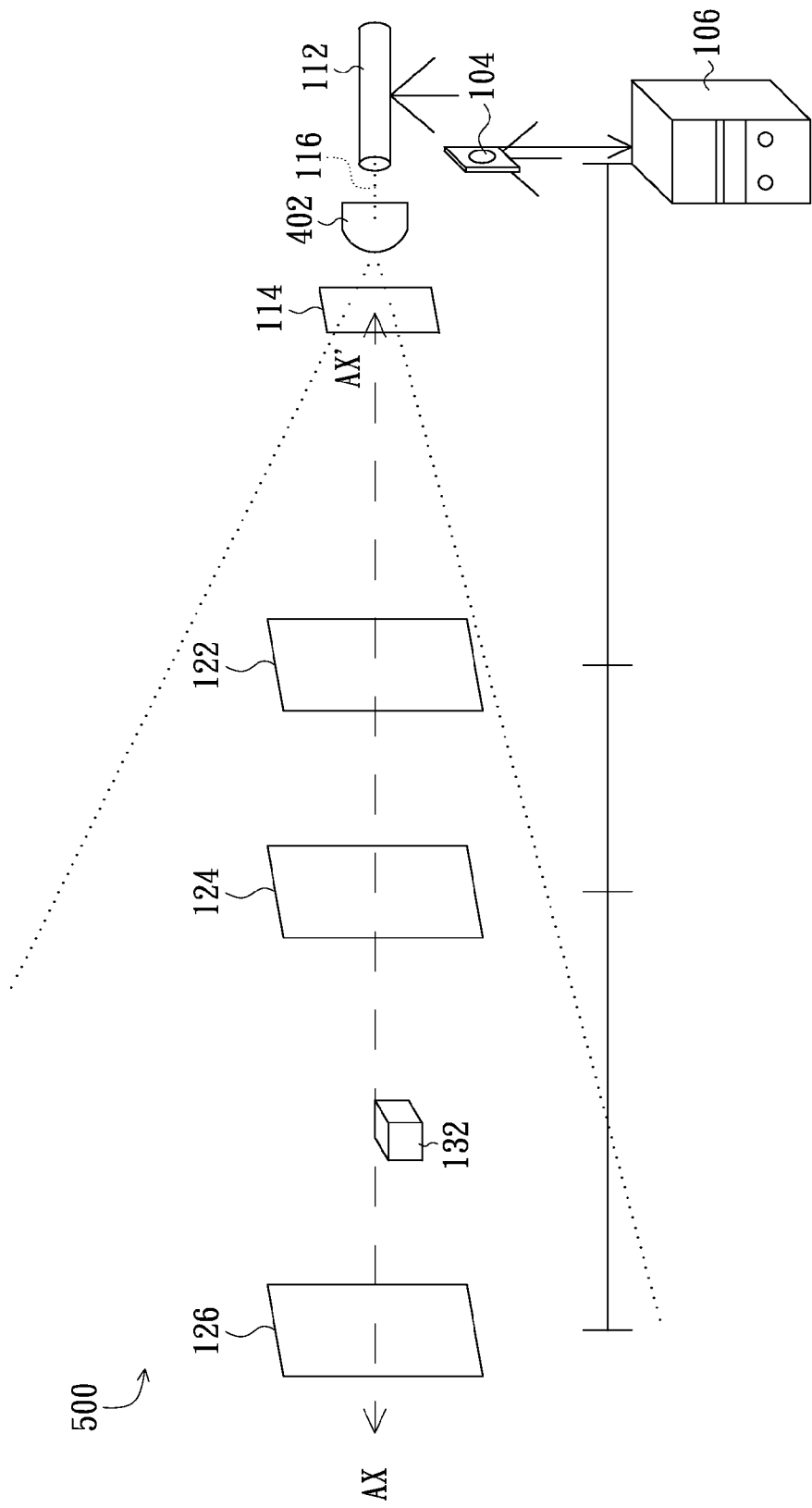
FIG. 5 is a schematic view of a distance measurement system in accordance with a third embodiment of the present invention.

FIG. 5 shows a distance measurement system in accordance with a third embodiment of the present invention. Referring to FIG. 5, in the distance measurement system 500 of the present embodiment, the image capture device 104 is arranged beside the laser light source 112.

Figure 6A:
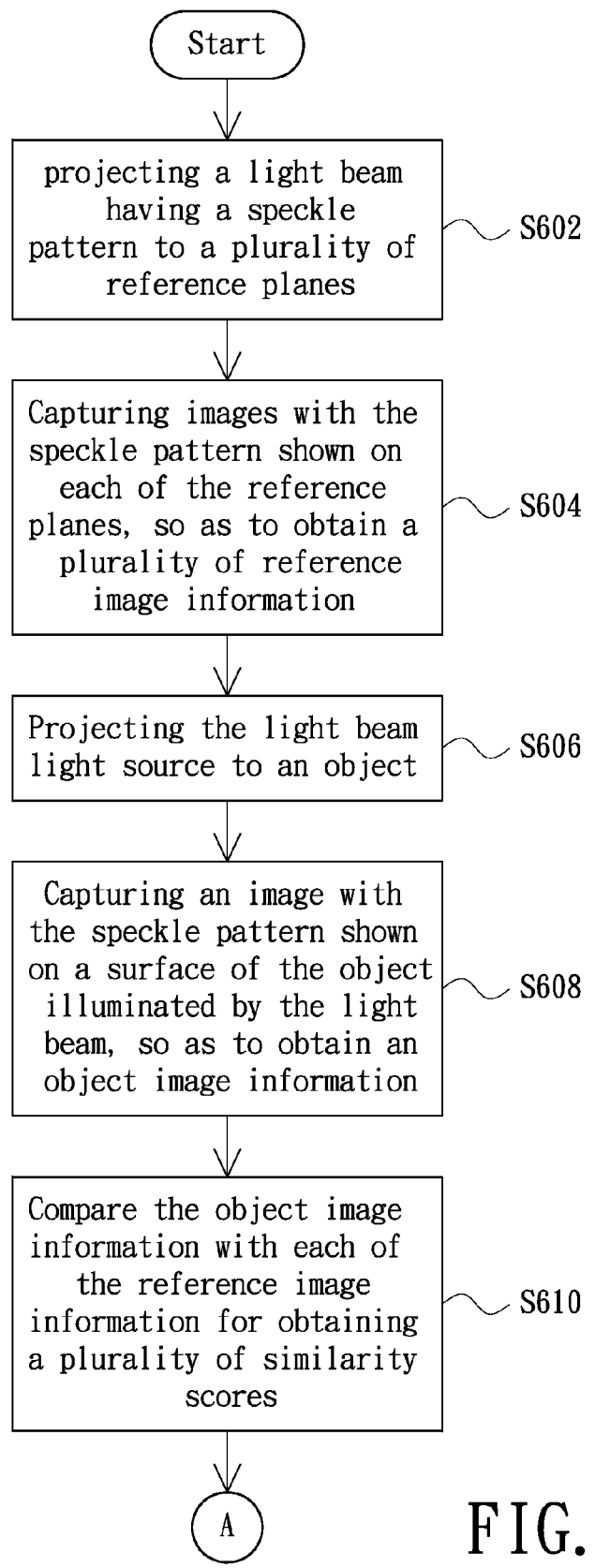
FIGS. 6A and 6B are flow charts of a distance measurement method in accordance with a preferred embodiment of the present invention.
Figure 6B:
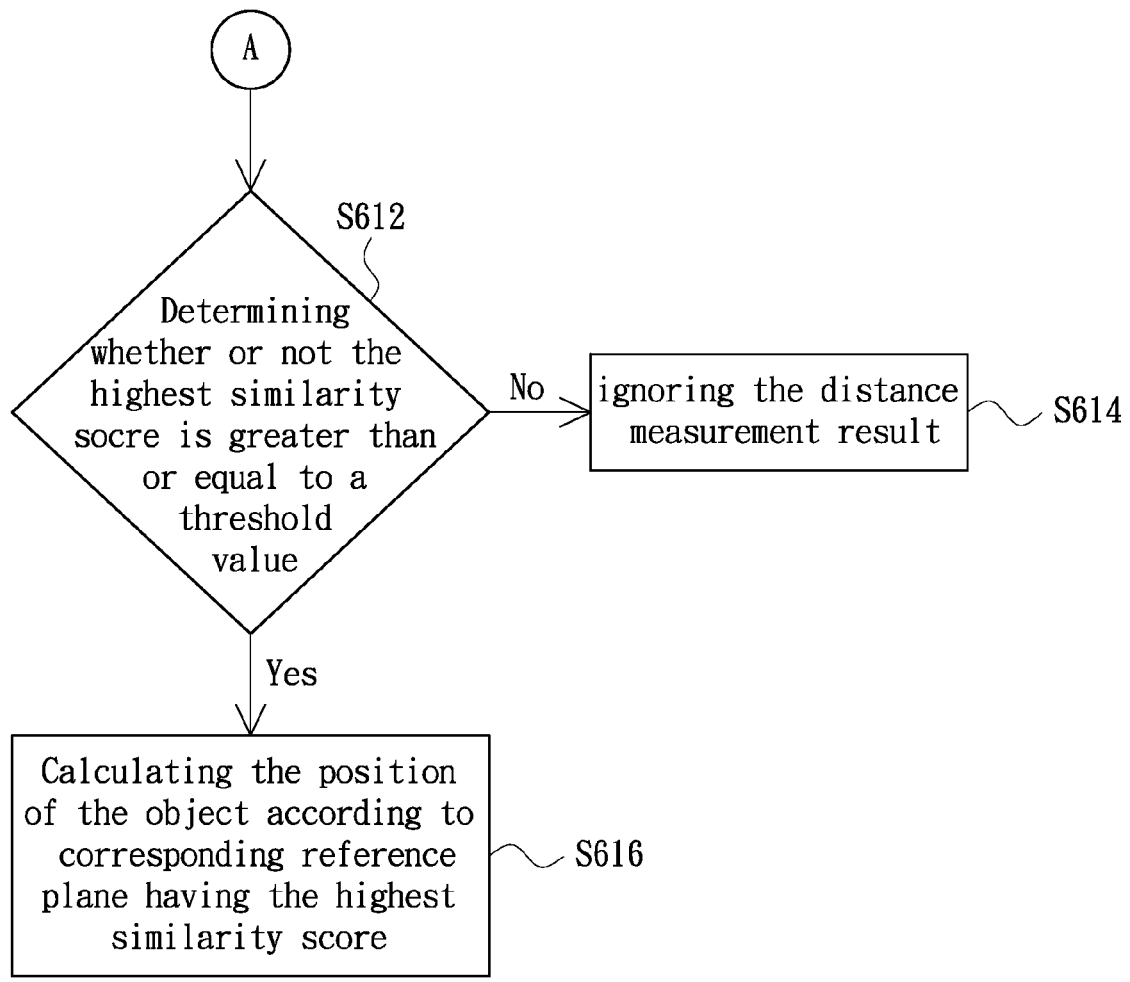

FIGS. 6A and 6B are flow charts of a distance measurement method in accordance with a preferred embodiment of the present invention. Referring to FIGS. 6A and 6B, the distance measurement method of the present embodiment may first include step S602, i.e., project a light beam having a speckle pattern provided from a planar light source module to a plurality of reference planes, wherein the speckle pattern has a plurality of speckles. Next, as step S604, capture an image having the speckle pattern shown on each of the reference planes, so as to obtain a plurality of reference image information associated with the reference planes. In addition, go to step S606, project the light beam having the speckle pattern to an object. Next, go to step S608, capture an image having the speckle pattern shown on a surface of the object illuminated by the light beam, so as to obtain an object image information associated with the object.

Next, go to step S610, compare the object image information with each of the reference image information for obtaining a plurality of similarity scores. At this time, go to step S612, determining whether or not the highest similarity score is greater than or equal to a threshold value. When the highest similarity score is less than a threshold value (i.e., it is "Not" in the decision of step S612), go to step S614, ignore the distance measurement. In contrast, when the highest similarity score is greater than or equal to the threshold value (i.e., it is "Yes" in the decision of step S612), compute the position of the object according the position of corresponding reference plane having the highest similarity score.

Concluded from the above description, the present invention projects a surface light source with a speckle pattern to a plurality of reference planes and a surface of an object, then obtains a plurality of reference image information associated with the reference planes and an object image information associated with the object. After comparing the object image information with the reference image information, the plurality of similarity scores are found, and the most similarity score is used to compute the position of the object. With this way, a 3D non-contact distance measurement system and method are provided, and the non-contact distance measurement system and method can have a high reliability.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A distance measurement system, comprising:
a plurality of reference planes;
a light source module, provided a light beam having a speckle pattern to the reference planes and an object, so that a plurality of images having the speckle pattern are shown on the reference planes and a surface of the object respectively, wherein the speckle pattern has a plurality of speckles;
an image capture device, capturing the images having the speckle pattern on each reference plane to generate a plurality of reference image information, and capturing the image having the speckle pattern on the surface of the object to generate an object image information; and a processing module, coupled to the image capture device so as to normalize the bright of the speckles, compute the position of each of the speckles on each of the reference image information based on the bright of speckles on each of the reference planes, and compare the position of each of the speckles on the object image information with the position of each of the speckles on each of the reference image information to obtain a plurality of similarity scores, wherein when the highest similarity score is less than a threshold value, the processing module ignores the distance measurement result, and when the highest similarity score is greater than or equal to the threshold value, the processing module computes the position of the object according to the position of corresponding reference plane with the highest similarity score.

2. The distance measurement system of claim 1, wherein the light source module comprises a planar light source module.

3. The distance measurement system of claim 1, wherein the light source module comprises:
   a laser light, providing a laser light beam; and
   a light diffusing element, placed in a transmission path of the light beam to perform the light beam having the speckle pattern.

4. The distance measurement system of claim 3, wherein the light diffusing element comprising a diffusion sheet, a piece of ground glass or a diffraction element.

5. The distance measurement system of claim 1, wherein the image capture device comprising a video camera or a charge-coupled device.

6. The distance measurement system of claim 1, wherein the reference planes are parallel with each other in a viewable region, and are perpendicular to an optical axis of the light source module.

7. The distance measurement system of claim 1, wherein the distances between each of reference planes and next reference planes are the same.

8. A distance measurement method, comprising:
   projecting a light beam having a speckle pattern to a plurality of reference planes and an object, so that a plurality of images having the speckle pattern are shown on the reference planes and a surface of the object, wherein the speckle pattern has a plurality of speckles;
   capturing the images having the speckle pattern on each of the reference planes so as to generate a plurality of reference image information;
   capturing the image having the speckle pattern on the surface of the object to generate an object image information;
   normalizing the bright of the speckles;
   computing the position of each of the speckles on each of the reference image information based on the bright of speckles on each of the reference planes;
   comparing the position of each of the speckles on the object image information with the position of each of the speckles on each of the reference image information to obtain a plurality of similarity scores;
   determining whether or not the highest similarity score is greater than or equal to a threshold value;
   ignoring the distance measurement result, when the highest similarity score is less than the threshold value; and
   computing the position of the object according to the position of corresponding reference plane with the highest similarity score, when the highest similarity score is greater than or equal to the threshold value.

9. A non-transitory storage media, having a processing software suitable for a distance measurement system for analyzing a position of an object, wherein the processing software at least performs the following steps:
   receiving a plurality of reference image information derived from a plurality of images shown on a plurality of reference planes by reflecting a light beam having a speckle pattern, wherein the speckle pattern having a plurality of speckles;
   receiving an object image information derived from an image shown on a surface of an object by reflecting light beam having the speckle pattern;
   normalizing brightness of the speckles to eliminate influence of environment light;
   computing the position of each of the speckles in each of the reference image information based on the brightness of speckles on each of the reference planes;
   comparing the position of each of the speckles on the object image information with the position of each of the speckles on each of the reference image information to obtain a plurality of similarity scores;
   determining whether or not the highest similarity score is greater than or equal to a threshold value;
   ignoring the distance measurement result, when the highest similarity score is less than the threshold value; and
   computing the position of the object according to the position of corresponding reference plane having the highest similarity score, when the highest similarity score is greater than or equal to the threshold value.

* * * * *